United States Patent
Morgenstern et al.

(10) Patent No.: US 7,070,146 B2
(45) Date of Patent: Jul. 4, 2006

(54) AIRCRAFT THICKNESS/CAMBER CONTROL DEVICE FOR LOW SONIC BOOM

(75) Inventors: John M. Morgenstern, Lancaster, CA (US); Alan E. Arslan, Santa Clarita, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 87 days.

(21) Appl. No.: 10/651,782

(22) Filed: Aug. 29, 2003

(65) Prior Publication Data

US 2005/0067525 A1    Mar. 31, 2005

(51) Int. Cl.
 *B64C 30/00* (2006.01)
(52) U.S. Cl. ............ 244/35 A; 244/1 N; 244/130
(58) Field of Classification Search .......... 244/113, 244/1 N, 35 A, 75 R, 130
See application file for complete search history.

(56) References Cited

U.S. PATENT DOCUMENTS

| | | | |
|---|---|---|---|
| 2,995,320 A | * | 8/1961 | Gottschalk .............. 244/15 |
| 3,425,650 A | * | 2/1969 | Silva ...................... 244/130 |
| 4,828,204 A | | 5/1989 | Friebel |
| 5,076,590 A | | 12/1991 | Steinetz et al. |
| 5,282,588 A | | 2/1994 | August |
| 5,495,999 A | | 3/1996 | Cymara |
| 5,526,999 A | * | 6/1996 | Meston .................... 244/2 |
| 5,740,984 A | * | 4/1998 | Morgenstern ........... 244/1 N |
| 5,797,105 A | | 8/1998 | Nakaya et al. |
| 6,039,325 A | | 3/2000 | Steinetz et al. |
| 6,119,985 A | | 9/2000 | Clapp et al. |

OTHER PUBLICATIONS http://www.faqs.org/docs/air/avgrpn.html, (Goebel) Jun. 1, 2002.

* cited by examiner

*Primary Examiner*—Jeffrey L. Gellner
*Assistant Examiner*—T D. Collins
(74) *Attorney, Agent, or Firm*—Koestner Bertani LLP

(57) ABSTRACT

An aircraft thickness/camber control device mounts to the lower surface of a airfoil configuration, for example on a fuselage, and extends along a longitudinal axis. The device, when deployed, generates expansions ahead of compressions generated by off-design conditions, inlet spillage for example, and enables maintenance of a low boom signature. The device, when positioned at appropriate locations, may also be used as a drag reduction device. The thickness/camber control device comprises a structural member capable of coupling to the airfoil at a position forward of the concentrated source of added compression and a control element. The control element is coupled to the structural member and controls the structural member to adjust thickness/camber of the configuration to cancel the far-field effect of the extra compression or concentrated pressure source.

21 Claims, 14 Drawing Sheets

AIRCRAFT THICKNESS/CAMBER CONTROL DEVICE FOR LOW SONIC BOOM

BACKGROUND OF THE INVENTION

Air travelers have long sought the convenience and efficiency of widespread supersonic commercial aviation only to be denied by technological, economic, and political roadblocks. With operations spanning over a quarter of a century, the Concorde remains the only commercial aircraft that travels at supersonic speeds but struggles with technological obsolescence. Fuel consumption and maintenance requirements of the Concorde strain commercial feasibility in today's competitive environment. Possibly overshadowing other technological and economic shortcomings is the Concorde's thunderous sonic boom that is capable of shattering windows in buildings under the flight path, a burden that restricts the Concorde to routes over oceans.

The sonic boom creates a major practical risk of commercial supersonic aviation so long as commercial supersonic aircraft are prohibited from flying over populated land masses.

A sonic boom occurs due to pressure waves that occur when an aircraft moves at supersonic speeds. During subsonic flight, air displaced by a passing plane flows around the plane in the manner water flows around an object in a stream. However, for a plane flying at supersonic speeds, the air cannot easily flow around the plane and is instead compressed, generating a pressure pulse through the atmosphere. The pressure pulse intensity decreases as a consequence of movement from the airplane, and changes shape into an N-shaped wave within which pressure raises sharply, gradually declines, then rapidly returns to ambient atmospheric pressure. A wall of compressed air that moves at airplane speed spreads from the wave and, in passing over ground, is heard and felt as a sonic boom. The rapid changes in pressure at the beginning and end of the N-wave produce the signature double bang of the sonic boom.

Research has recently shown that boom intensity can be reduced by altering aircraft shape, size, and weight. For example, small airplanes create a smaller amplitude boom due to a lower amount of air displacement. Similarly, a lighter aircraft produces a smaller boom since an airplane rests on a column of compressed air and a lighter plane generates a lower pressure column. An aircraft that is long in proportion to weight spreads the N-wave across a greater distance, resulting in a lower peak pressure. Furthermore, wings that are spread along the body and not concentrated in the center as in a conventional aircraft produces a pressure pulse that is similarly spread, resulting in a smaller sonic boom.

One technique for boom reduction is shaping. Shaped sonic boom refers to a technique of altering source pressure disturbance such that a non-N-wave shape is imposed on the ground. Shaping sonic boom can reduce loudness by 15–20 dB or higher with no added energy beyond that to sustain flight. Shaping to minimize loudness is based on insight regarding changes in aircraft pressure disturbances during propagation to the ground.

Shaped sonic booms are only achieved deliberately. No existing aircraft creates a shaped sonic boom that persists for more than a fraction of the distance to the ground while flying at an efficient cruise altitude since non-shaped pressure distributions quickly coalesce into the fundamental N-wave shape. The N-wave form generates the largest possible shock magnitude from a particular disturbance. The N-wave shape results because the front of a supersonic aircraft generates an increase in ambient pressure while the rear generates a decrease in pressure. Variation in propagation speed stretches the disturbance during propagation to the ground. Shaped boom techniques typically attempt to prevent coalescing of the pressure disturbance by adding a large compression at the aircraft nose and an expansion at the tail with pressure in between constrained between the compression and expansion. The shaped boom stretches the ends of the signature faster than the in-between pressures, creating a non-N-wave sonic boom at the ground.

Boom reduction makes a supersonic aircraft less objectionable by minimizing the loudness of a sonic boom. Audible frequencies in a sonic boom occur in the rapid pressure changes, or shocks, at the beginning and end of the typical N-waveform. More quiet shocks have decreased pressure amplitudes and increased pressure change time durations.

SUMMARY OF THE INVENTION

What is desired are external shapes and lift devices that facilitate sonic boom reduction.

According to various embodiments, an aircraft or aircraft control system utilizes a deployable and stowable structural element on the airfoil to counter the spillage at off-design conditions and obtain a lower amplitude sonic boom for a supersonic cruise aircraft.

In accordance with some embodiments of the disclosed aeronautical system, an aircraft fuselage thickness/camber control device create a local expansion that, when propagated to the far field, cancels the added compression generated by inlet spillage shock. The thickness/camber control device comprises a structural member capable of modifying the local camber and thickness of the fuselage at a position forward of the concentrated source of increase in compression, for example the spillage shock, and a control element. The control element is coupled to the structural member and controls the structural member to adjust thickness/camber of the airfoil to cancel the far-field effect of the concentrated source of increased compression.

In accordance with other embodiments, an aircraft comprises a bulge, bump, protrusion, or the like, that extends along a longitudinal axis forward and aft and that has a concentrated source of compression, a structural member capable of coupling to the bulge, bump, or protrusion at a position forward of the concentrated source of compression that results from an off design condition, and a control element. The control element is coupled to the structural member and controls the structural member to adjust thickness/camber of the fuselage to cancel the far-field effect of the concentrated source of pressure.

According to further embodiments, a method of reducing the sonic boom in a supersonic cruise aircraft comprises deploying a structural member on an lower surface of a fuselage that extends along a longitudinal axis forward and aft and that has a concentrated source of expansions at a position forward of the concentrated source of pressure. The method further comprises controlling the structural member to adjust thickness/camber of the airfoil to cancel the far-field effect of the concentrated source of compression.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

Figure 1:
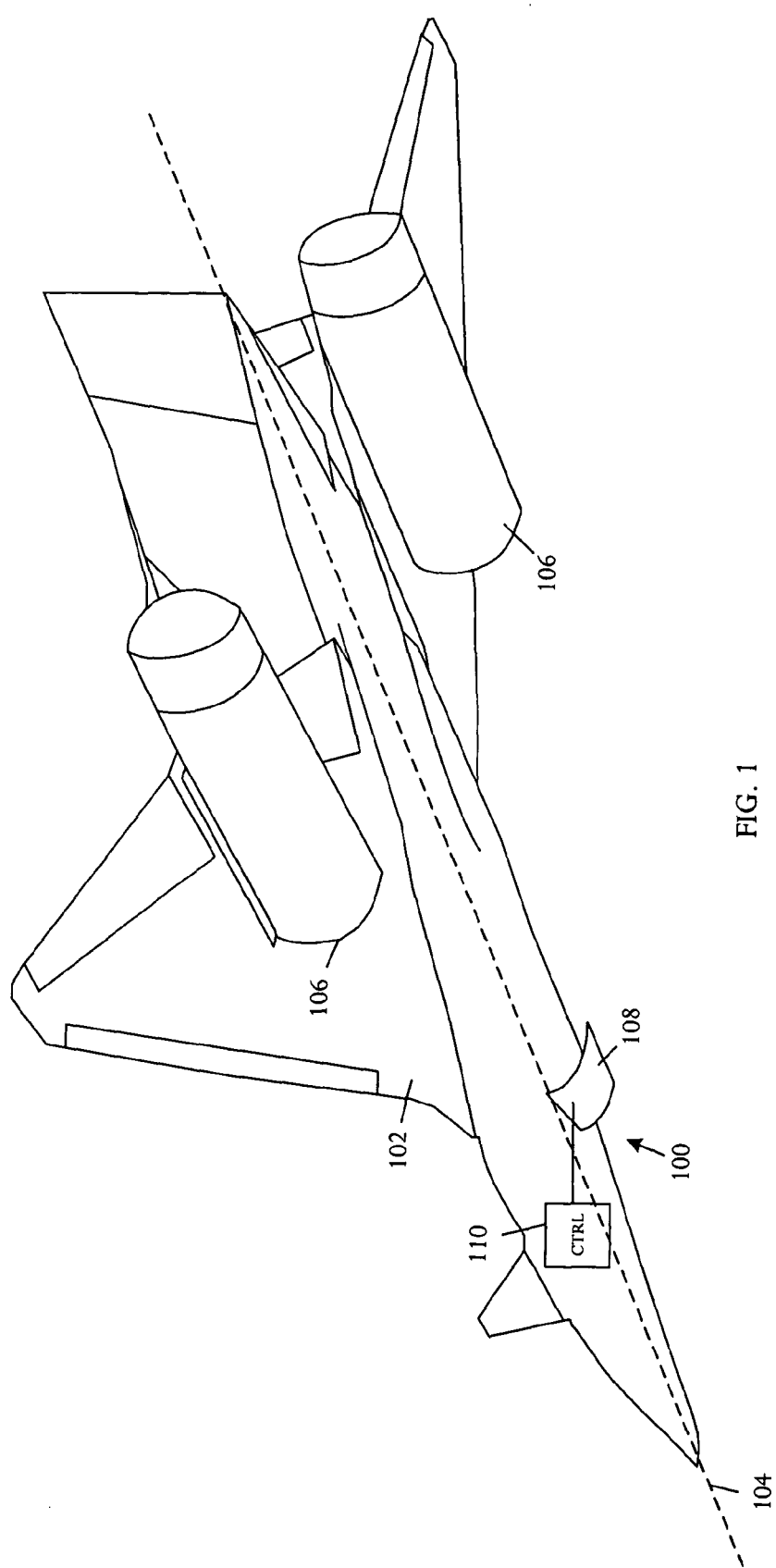
FIG. 1 is a schematic pictorial and block diagram that illustrates an example of an aircraft thickness/camber control device capable of usage with an airfoil.

Referring to FIG. 1, a schematic pictorial and block diagram illustrates an example of an aircraft thickness/camber control device 100 extending along a longitudinal axis 104 forward and aft and that has a concentrated source of compression 106 for example that results from inlet shock or spillage. The thickness/camber control device 100 comprises a structural member 108 that mounts on the bottom of the outer mold line at a position forward of the concentrated source of compression 106 and a control element 110. The control element 110 is connected to the structural member 108 and controls the structural member 108 to adjust thickness/camber of the airfoil 102 and generates expansions that cancel the far-field effect created by the concentrated source of compression 106.

Typically, the largest concentrated source of compression 106 in an aircraft is a nacelle. An airfoil is generally designed for most aerodynamically-efficient performance at a particular Mach number or range of Mach numbers. In various circumstances and conditions, operation at off-design Mach numbers is desirable. For example, operating at off-design Mach numbers at selected times can increase aircraft range. During operations in off-design conditions, the nacelle 106 creates a spillage shock that is larger than a desired baseline cruise configuration for a low sonic boom signature. The control element 110 adjusts airfoil thickness/camber so that the far-field effects of the controlled structural member 108 and the nacelle 106 substantially cancel.

The thickness/camber control device 100 has particular utility in a supersonic cruise aircraft with an area distribution that matches a low sonic boom signature. In off-design conditions the concentrated source of compression 106 generates a spillage shock larger than the baseline cruise configuration for the low sonic boom signature. To reduce the sonic boom, the control element 100 adjusts the structural member 108 so that the far-field effect of the adjusted structural member 108 cancels the far-field effect resulting from the spillage shock. The control element 110 adjusts the structural member 108 in off-design conditions so that the expansion generated around the structural member 108 effectively reduces the equivalent area distribution ahead of the spillage shock.

The thickness/camber control device 100 utilizes the control element 110 to adjust the structural member 108 to effectively modify the camber of the airfoil 102 to minimize or reduce spillage shock resulting from the concentrated source. Controlled adjustments of the fuselage thickness and camber can operate either to block the nacelle spillage effects, thereby softening the sonic boom signature, or as a moveable active feedback device to adjust aircraft aerodynamics.

The thickness/camber control device 100 adjusts body area of the airfoil 102 and fuselage thickness/camber ratio to reduce sonic boom effects. The thickness/camber control device 100 does introduce some drag when deployed, typically a drag increase of approximately 5% for a particular embodiment. Accordingly, the thickness/camber control device 302 is stowed when unused so that drag is reduced when operating in compliance with design conditions. For example, the thickness/camber control device 302 can be deployed when flying over land to reduce or minimize sonic boom effects. When flying over oceans, the thickness/camber control device 302 can be stowed The control element 110 includes any operating controls that can be manipulated by a pilot, either with or without supporting electronics, processors, computers, controllers, and the like. The control element 110 further includes any linkages or actuators connected to the structural element 108 to physically move the structural element 108.

The airfoil 102 generally includes aircraft wings and also includes other aerodynamic shapes including a fuselage, tail, and other structures within the air stream.

Figure 2A:
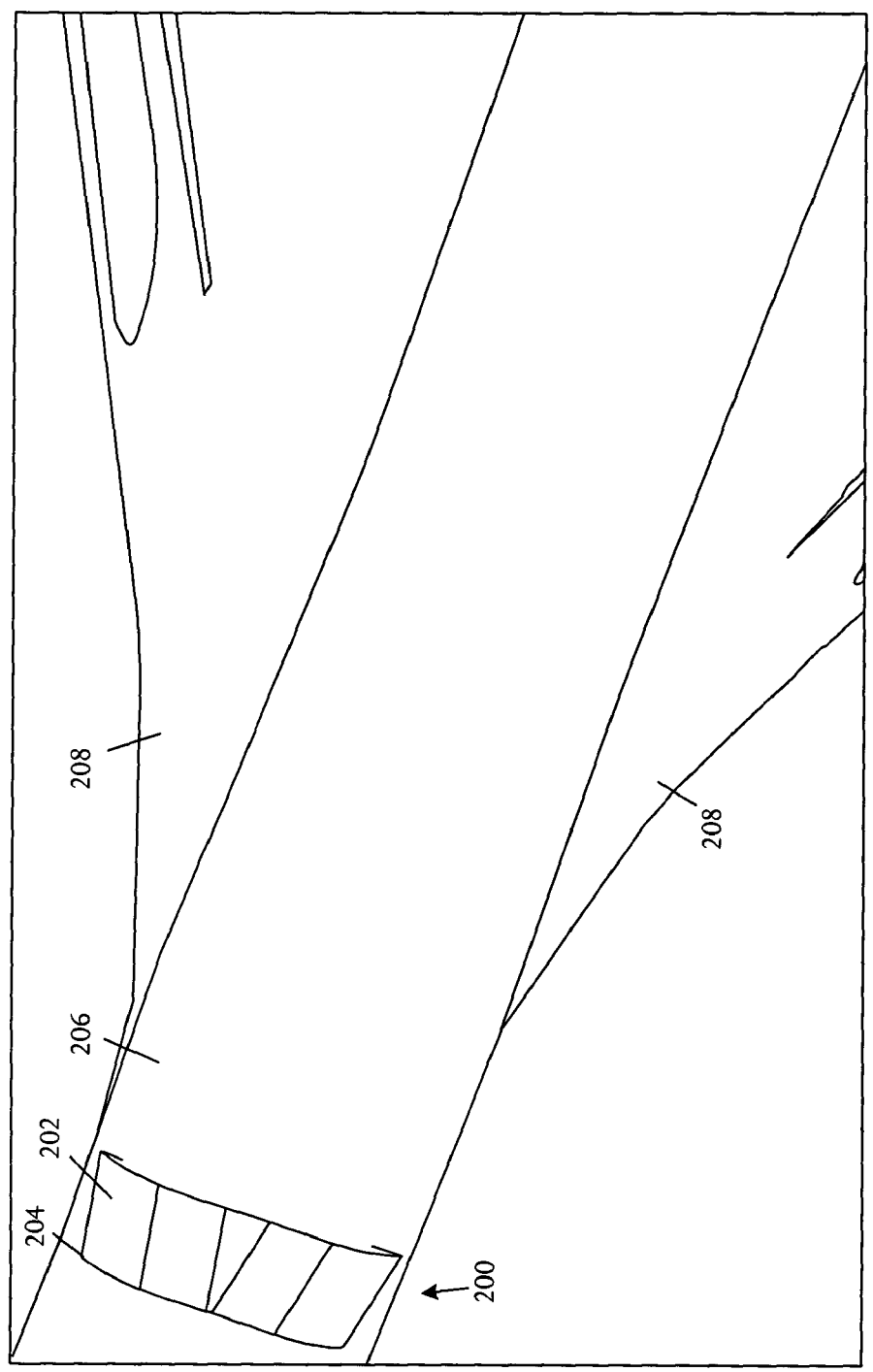
FIGS. 2A through 2F show several examples of thickness/camber control devices that can be used to improve aerodynamics and reduce sonic boom amplitude in supersonic aircraft.

FIGS. 2A through 2F show several examples of thickness/camber control devices that can be used to improve aerodynamics and reduce sonic boom amplitude in supersonic aircraft. Referring to FIG. 2A, some embodiments of the thickness/camber control device utilize a structural member in the form of a body flap 200, such as control surface 202 hinged 204 to a lower section of the fuselage 206 forward of the wings 208 and nacelles.

Figure 2B:
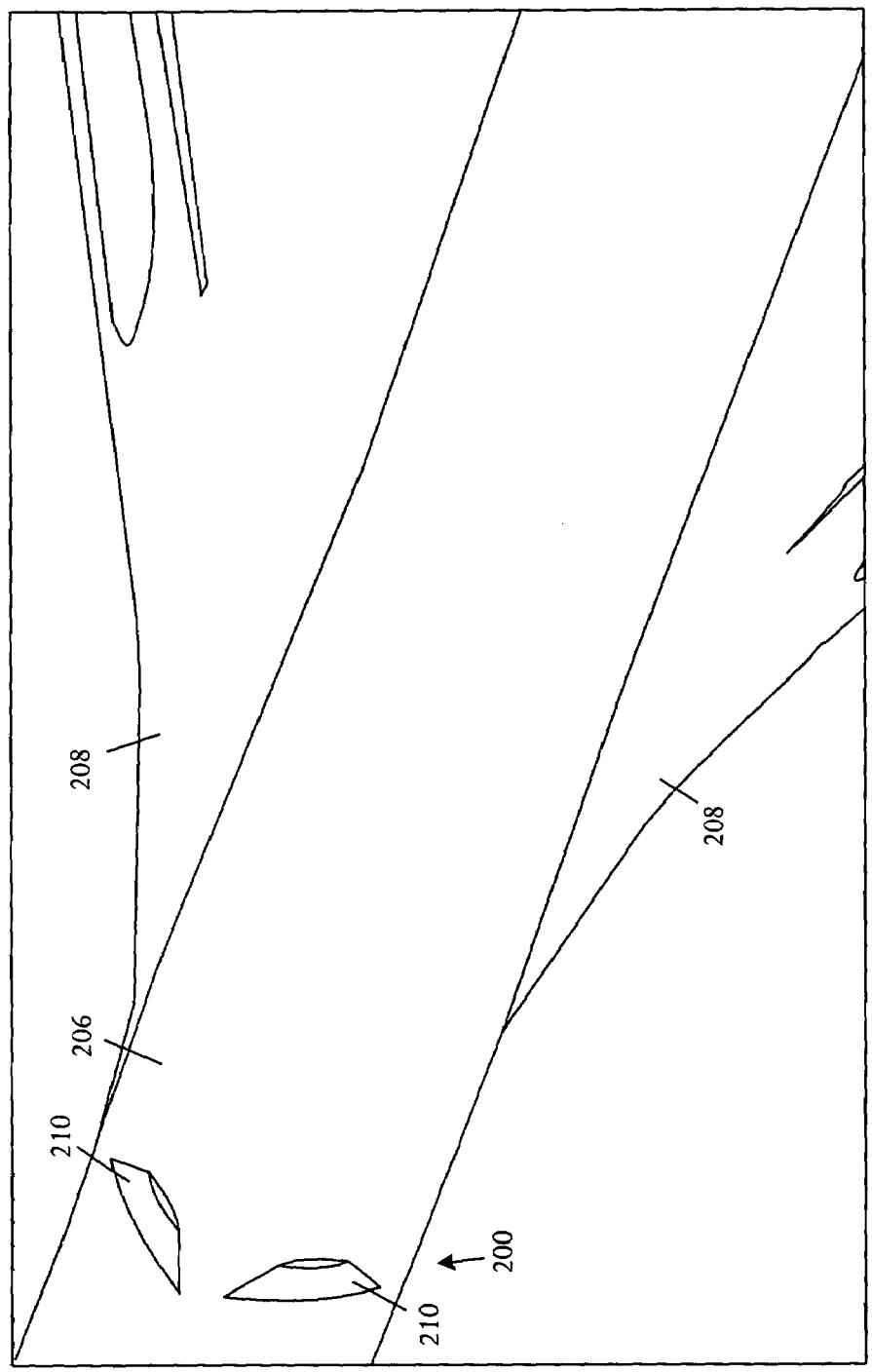

FIG. 2B shows an example of a thickness/camber control device embodiment that utilizes canards 210 as a structural member to effectively increase the thickness of the fuselage 206 forward of the nacelles. The canards 210 are stowable and deployable to cancel the far-field effect resulting from the spillage shock and tailor the sonic boom signature of the aircraft.

Figure 2C:
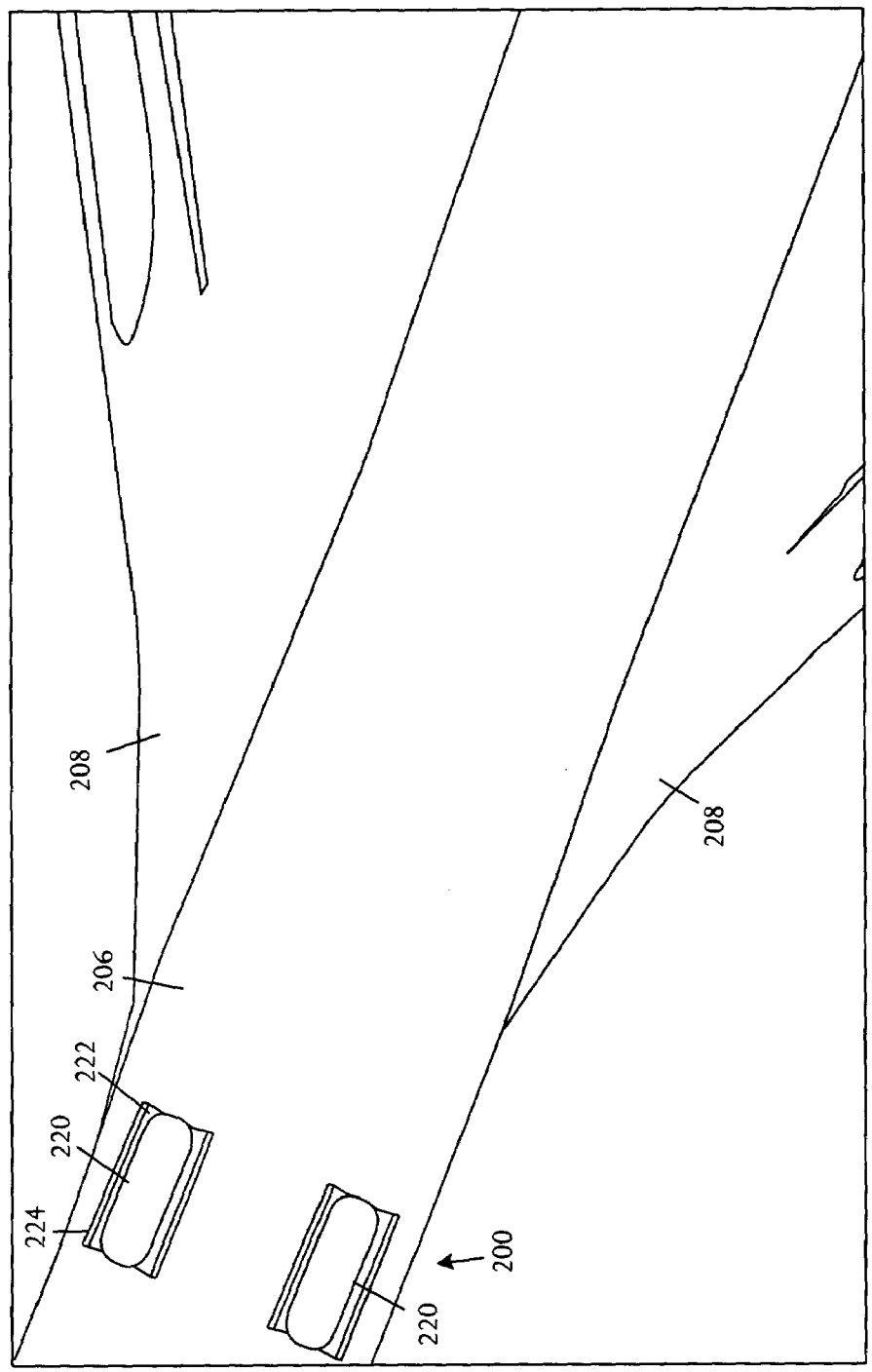

FIG. 2C depicts an embodiment of a thickness/camber control device that deploys and stows a pair of fairings 220 as structural members for controlling aerodynamics of an aircraft. The fairings 220 are stowed in the aircraft fuselage 206 within a compartment 222 covered by doors 224. The fairings 220 are deployed by structural linkages that open the doors and extend the fairings 220 from the fuselage 206.

Figure 2D:
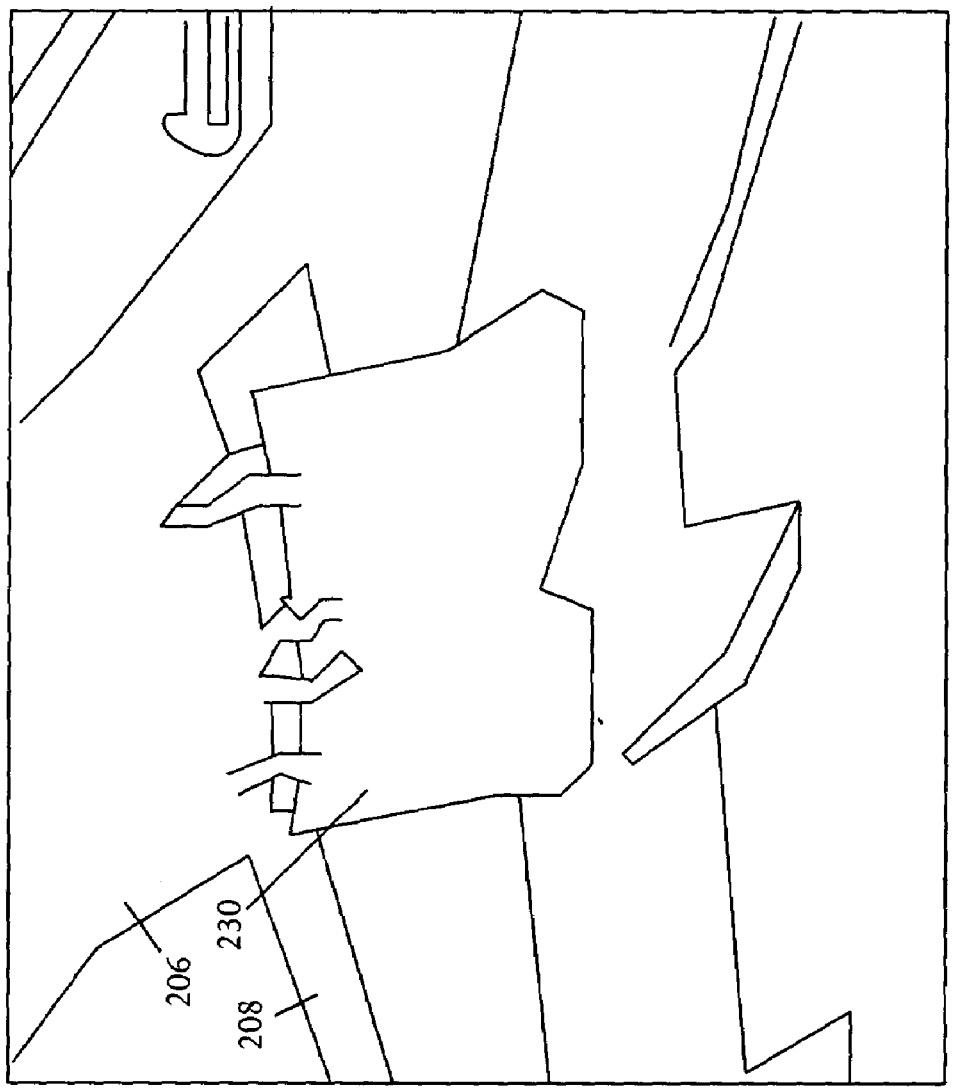

FIG. 2D shows an embodiment of a thickness/camber control device that deploys and stows a speed brake 230 to control aircraft aerodynamics and manage sonic boom signature.

Figure 2E:
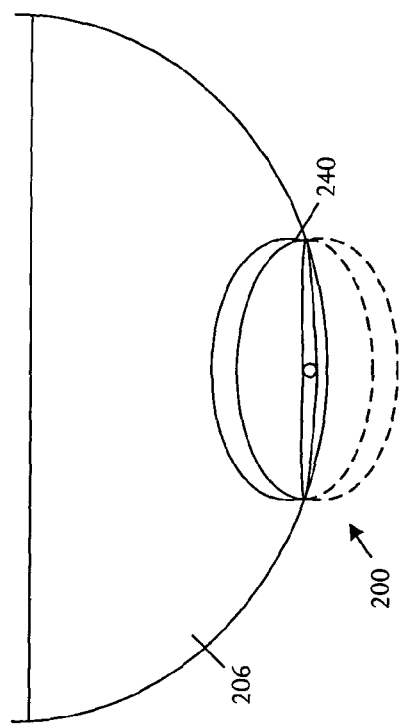
Figure 2F:
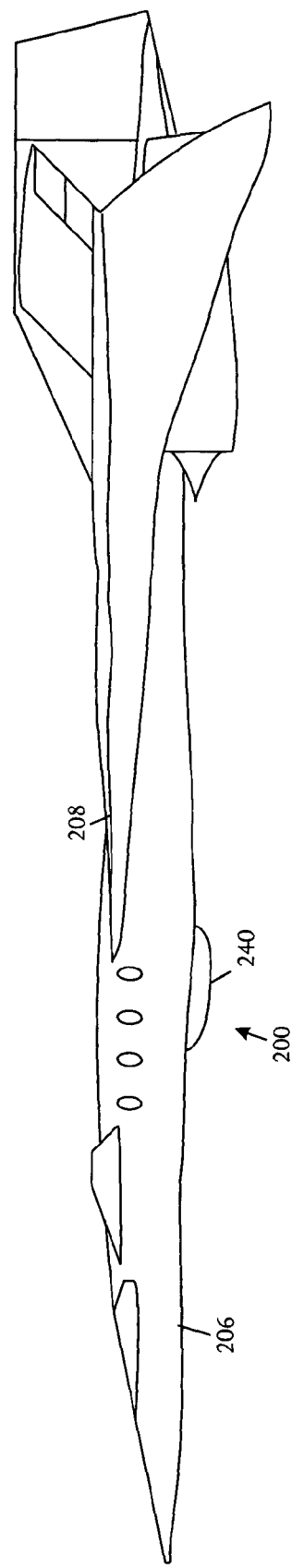

FIGS. 2E and 2F respectively show a cross-sectional view of an aircraft fuselage 206 with a thickness/camber control device 200, and a side view of the aircraft. The thickness/camber control device 240 has the form of a protrusion 240 that can be rotated out of the fuselage 206 on deployment and into the fuselage 206 for stowage.

Other structures can be used such as protrusions, extensions, or wideners that are deployable and stowable to increase cross-sectional area of the fuselage forward of a concentrated source of compression, such as the nacelle or nacelles. The structures can be an active drag device, fairing, protrusion, or bank of actuators that extends from the fuselage, thereby enlarging the cross-sectional area of the airfoil, when deployed, and that forms a flush surface with the fuselage when stowed.

Figure 3:
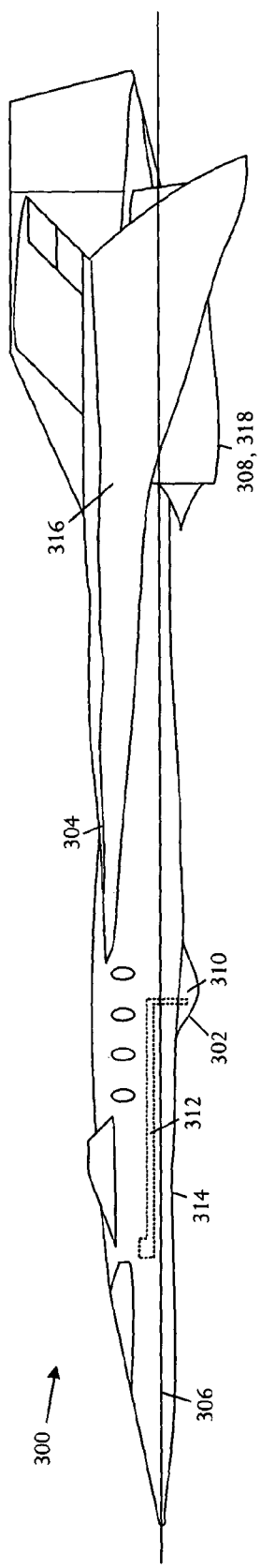
FIG. 3 is a pictorial schematic diagram showing an example of a supersonic aircraft that includes a thickness/camber control device capable of improving flight aerodynamics and reducing sonic boom effects.

Referring to FIG. 3, a pictorial schematic diagram shows an example of a supersonic aircraft 300 that includes a thickness/camber control device 302 capable of improving flight aerodynamics and reducing sonic boom effects. The thickness/camber control device 302 comprises a structural member 310 coupled to the airfoil 304 at a position forward of the concentrated source of pressure 308, and a control element 312. The control element 312 is coupled to the structural member 310 and controls the structural member 310 to adjust thickness/camber of the airfoil 304 to cancel the far-field effect of the concentrated source of compression 308.

The aircraft 300 further comprises a fuselage 314, an aircraft wing 316 coupled to the fuselage, and an engine nacelle 318. Commonly, the nacelle 318 is the largest concentrated source of compression 308 in an aircraft. In the illustrative aircraft 300, the engine nacelle 318 is coupled to the aircraft wing 316. The structural member 310 is coupled to the fuselage 314 forward of the engine nacelle 318 and is controllably deployed and stowed to adjust thickness/camber of the fuselage 314 to cancel the far-field effect of the engine nacelle 318.

Figure 4:
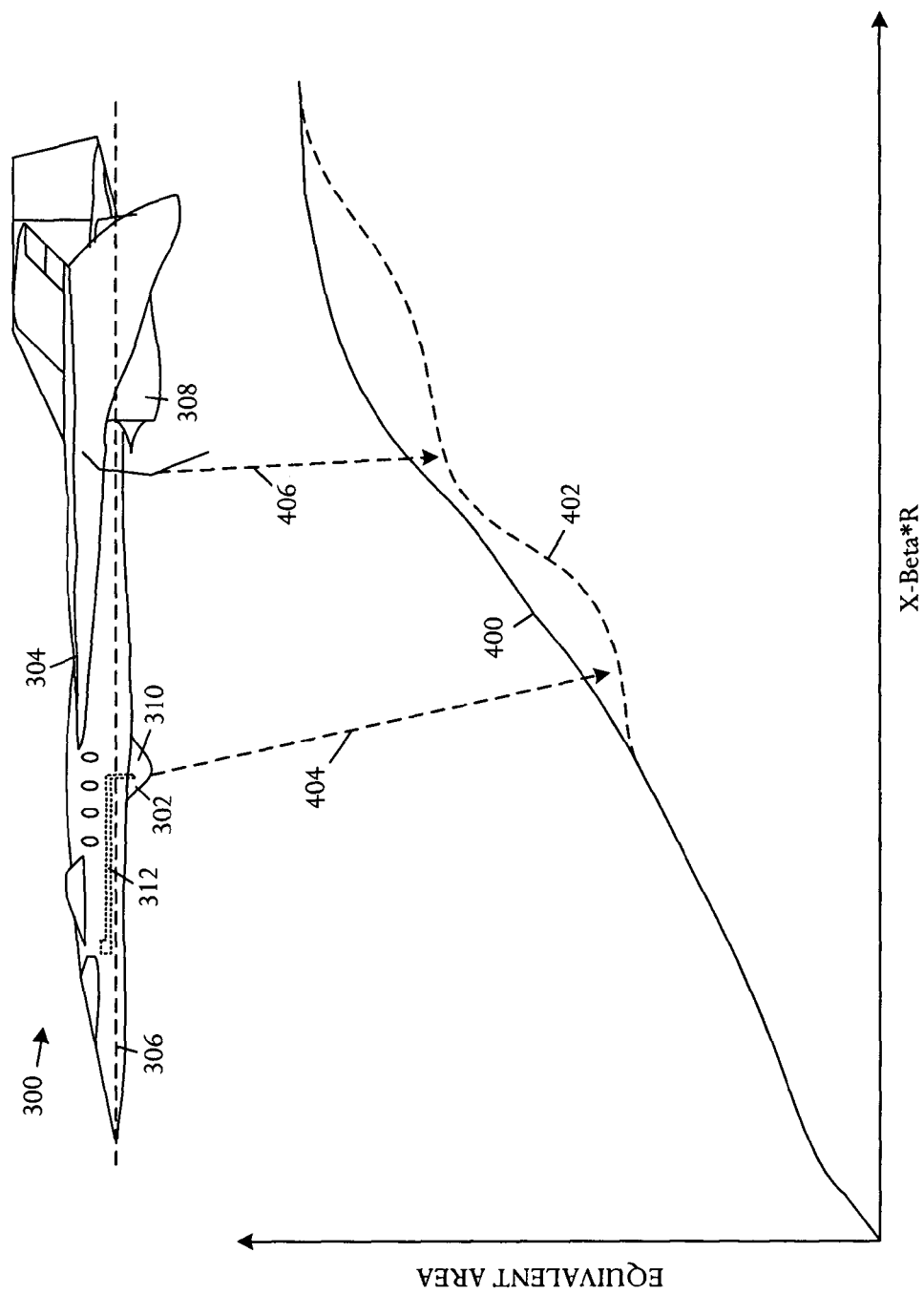
FIG. 4 shows a graph and schematic pictorial view of an aircraft to illustrate a technique for minimizing or reducing sonic boom effects using the thickness/camber control device.

Referring to FIG. 4, a graph and schematic pictorial view of an aircraft show an example of a technique for minimizing or reducing sonic boom effects using the thickness/camber control device 302. Jones-George-Seebass-Darden sonic boom minimization theory states a ground signature will have minimum shock strength (ramp signature) by following a calculated equivalent area distribution 400, defined by a program SEEB, which becomes a design goal. To attain the goal signature defined by the SEEB curve 400 for predetermined flight conditions of aircraft weight, altitude, and Mach number, a control procedure either deducts or adds to the configuration equivalent areas. If Mach angle cross-sectional areas 402 are configured to approximate the SEEB curve 400, a control procedure is termed "area boom-ruling," as distinguished from "lift boom-ruling" if the lift distribution on the aircraft were modified to match the SEEB curve 400.

In off-design conditions, the concentrated source of pressure created by the nacelle 308 generates the spillage shock 406 that exceeds the baseline cruise level configuration for a low sonic boom signature 400. The thickness/camber control device 302 adjusts airfoil aerodynamics in the off-design conditions to generate an expansion 404 around the structural member 310 to effectively reduce the equivalent area distribution ahead of the shock 406 as shown in the controlled equivalent area plot 402 that is beneath the SEEB curve 400. The control element 312 adjusts the structural member 310 to improve aerodynamic flow fields for flight at Mach numbers different from the Mach number to which the aircraft design is optimized.

The equivalent area curve 402 of the aircraft 300 shows the increase in equivalent area resulting from the spillage shock 406. The thickness/camber control device 302 corrects for the increase in equivalent area by creating the expansion 404 that pulls the aircraft equivalent area curve 402 below the SEEB curve 400 at all positions relative to the aircraft 300. To attain the reduced sonic boom goal, the aircraft equivalent area curve 402 can fall below but not above the SEEB curve 400.

The thickness/camber control device 302 can remain stowed while the aircraft 300 is operating with optimal aerodynamics at a predetermined design condition. However, the aircraft 300 can be alternatively operated at other conditions, for example to increase range or other purposes, with aerodynamics controlled by deploying the thickness/camber control device 302 to reduce sonic boom effects.

Figure 5:
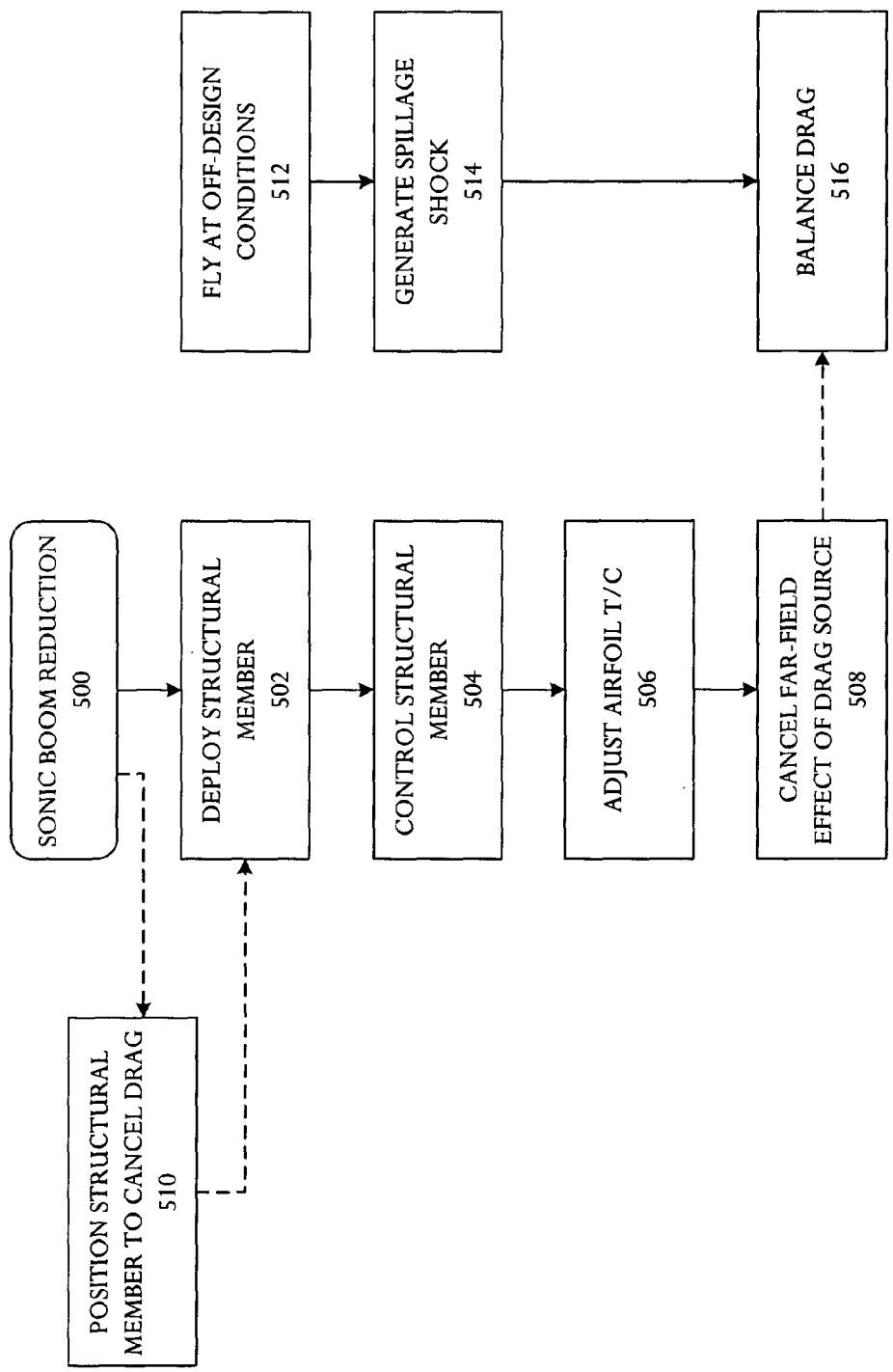
FIG. 5 is a flow chart depicting an embodiment of a method for reducing the sonic boom in a supersonic cruise aircraft.

Referring to FIG. 5, a flow chart depicts an embodiment of a method 500 for reducing the sonic boom in a supersonic cruise aircraft. The method 500 comprises deploying a structural member 502 on an airfoil that extends along a longitudinal axis forward and aft and that has a concentrated source of compression at a position forward of the concentrated source of compression. The method 500 further comprises controlling the structural member 504 to adjust thickness/camber of the airfoil 506 thereby canceling the far-field effect 508 of the concentrated source of compression.

One aspect of the method is that the aircraft is designed so that the structural member is positioned 510 at a location on the airfoil that facilitates cancellation of the far-field effect of the concentrated source of pressure.

The aircraft can be flown at off-design conditions 512 causing the concentrated compression to create a spillage shock larger than a baseline cruise configuration for a low sonic boom signature 514. In some embodiments, the method includes adjusting the structural member to vary airfoil thickness/camber so that the far-field effects of the controlled structural member and the concentrated source of compression substantially cancel 516.

Figure 6A:
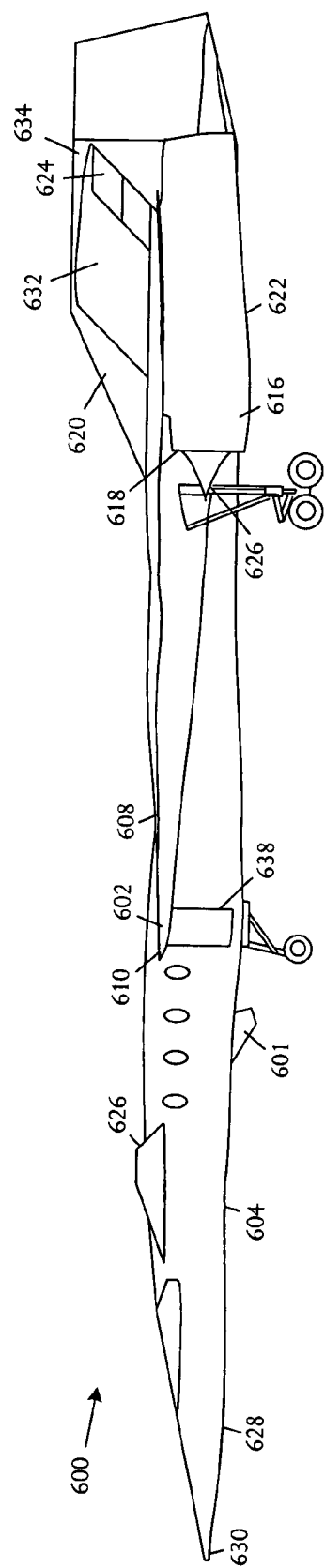
FIGS. 6A, 6B, and 6C are schematic pictorial diagrams respectively showing side, front, and top views of a supersonic aircraft with a thickness/camber control device.
Figure 6B:
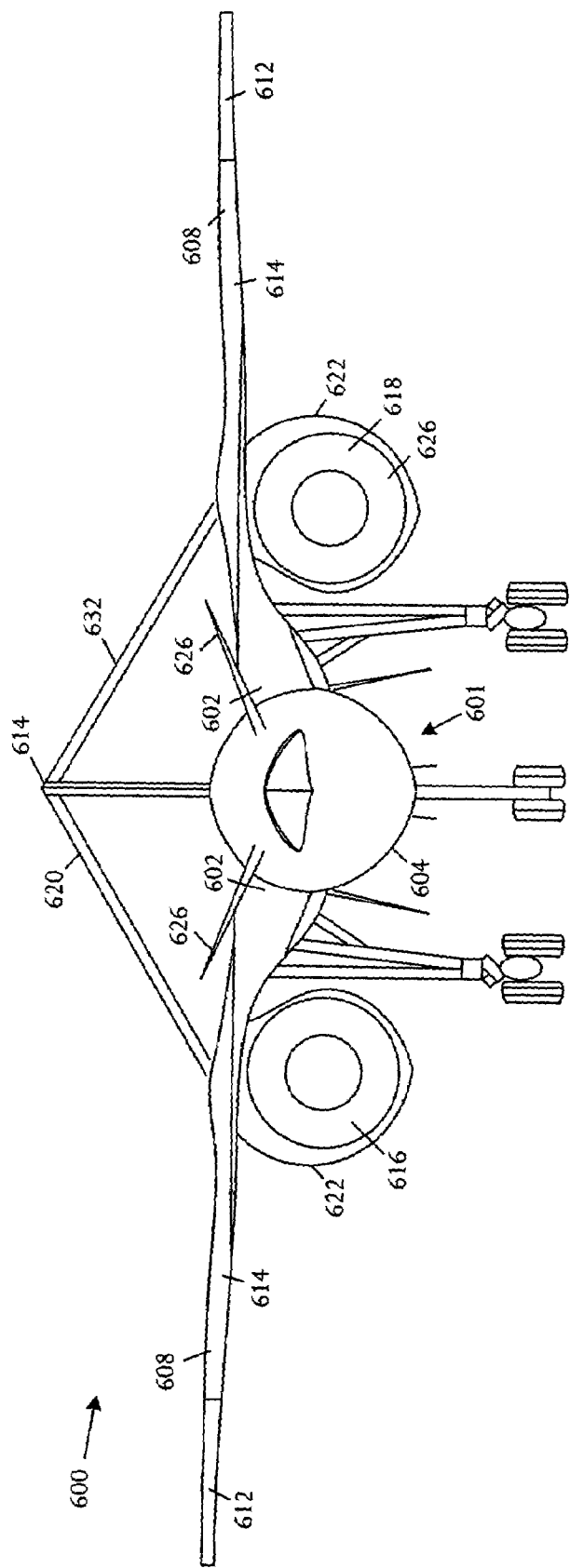
Figure 6C:
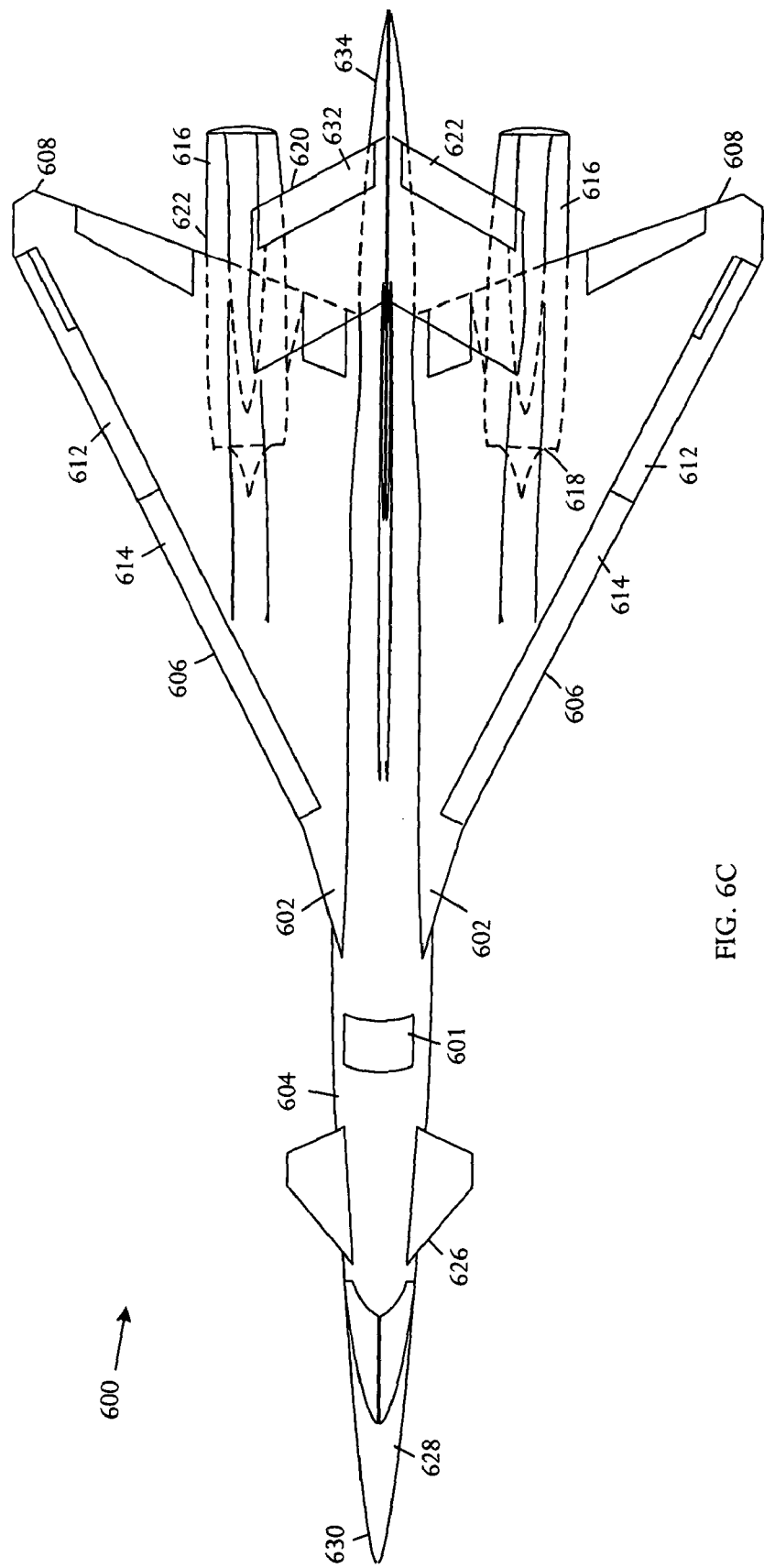

Referring to FIGS. 6A, 6B, and 6C, schematic pictorial diagrams respectively showing side, front, and top views of a supersonic aircraft 600 with a thickness/camber control device 601 that, in various embodiments, is capable of improving aircraft performance by facilitating positive aerodynamic effects including adjustment of flow fields to improve aerodynamics at a range of air speeds and maintaining a low sonic boom signature. The aircraft 600 comprises a fuselage 604 and an aircraft wing 608 mounted on the fuselage 604. The wing 608 has a leading edge 606. The wing 608 extends from an inboard edge at the fuselage 604 to an outboard edge at the wing tip. The aircraft lift device 601 further comprises a strake 602 capable of coupling to the fuselage 604 and extending to the leading edge 606 of the wing 608. The aircraft 600 further comprises a Krueger flap 614 coupled to the leading edge 606 of an inboard portion of the wing 608 adjacent the strake 602, and a leading edge flap 612 coupled to the leading edge 606 of the wing 608 and extending from a junction at the Krueger flap 614 to an outboard portion of the wing 608.

The aircraft 600 further comprises a control element, such as the control element 310 shown in FIG. 3 and at least one structural member such as the structural members shown in FIGS. 2A–2F. The control element is used to adjust the position of deployment of the thickness/camber control device 601 to improve aerodynamic flow fields for flight at Mach numbers different from the Mach number to which the aircraft design is optimized.

In illustrative embodiments, the aircraft 600 has engines 616 positioned in aft locations beneath the wings 608 and have a highly integrated wing/inlet geometry 626 to produce low-boom compatibility and low inlet/nacelle installation drag. The aircraft 600 can have an inverted V-tail geometry

632 that enhances low-sonic-boom longitudinal trim in cruise and allows better structural support for the engines 616.

In the illustrative embodiment, the aircraft 600 has an blunted nose 628 with a conical tip 630 and an inverted V-tail surface 632 that overlaps the wing 608, features that facilitate low-sonic-boom aircraft performance. The configuration suppresses features of a sonic boom pressure waveform that otherwise would make the boom audible. The supersonic aircraft 600 creates an N-shaped pressure wave caused by overpressure at the nose 628 and under pressure at the tail 634. Pressure rises rapidly at the nose 628, declines to an under pressure condition at the tail 634, and then returns to ambient pressure. Rapid pressure rises at the front and rear of the pressure wave producing the characteristic double explosion of the sonic boom.

The conical tip 630 of the nose 628 can create a pressure spike ahead of the aircraft forward shock, raising local temperature and sound velocity, thereby extending the forward shock and slowing the pressure rise. The supersonic aircraft 600 has a sharply swept arrow wing configuration 608 that reduces peak overpressure in the wave by spreading wing lift along the aircraft length. The wing configuration 608 has reduced wing leading and trailing edge sweeps. The inverted V-tail 632 can generate additional lift near the tail to improve aerodynamics and reduce boom.

The illustrative aircraft arrangement 600 has twin non-afterburning turbofan engines 616 set below and behind the wing 608. The non-afterburning turbofan engines 616 operate behind simple fixed-geometry axisymmetric external compression inlets 618. Considerations of community noise and takeoff, transonic, and cruise thrust specifications determine engine cycle selection and engine sizing.

The shaping of the supersonic aircraft 600 including aspects of the wing 608, the tail assembly or empennage 620, and the engine 616 structural integration are adapted according to sonic boom signature and supersonic cruise drag considerations. The empennage or tail system 620 includes stabilizers, elevators, and rudders in the inverted V-tail geometry 632. The inverted V-tail geometry 632 supports nacelles 622 in highly suitable positions relative to the wing 608 to suppress boom, and trims the supersonic aircraft 600 in cruise to attain an improved low-boom lift distribution. Panels of the inverted V-tail 632 support the nacelles 622 and non-afterburning turbofan engines 616 in combination with support of the wing 608 to handle flutter. Inverted V-tail control surfaces, termed ruddervators 624, adjust aircraft longitudinal lift distribution throughout the flight envelope to maintain a low boom, low drag trim condition.

The shape of the fuselage 604, the wing 608, and empennage 620 are integrated with the entire aircraft configuration so as to be conducive to attaining a low-boom signature and supersonic cruise drag levels. The wing 608 and/or fuselage 604 are integrated to achieve low-boom supersonic flight.

The wings 608 can have a substantial dihedral, or "gulling" incorporated into the wings 608 inboard of the engines 616. The dihedral geometry is most pronounced at the wing trailing edge. The gull or dihedral results from twisting and cambering the wing 608 for low-boom and low induced drag while preserving a tailored local wing contour in the position of main landing gear retraction.

In some embodiments, the inboard portion of the wing 608 can be configured to integrate with the nacelle 622 and a diverter formed between the nacelle 622 and the wing 608 to follow the contour of a low-sonic-boom fuselage 604 with as close a normal intersection as possible to attain low interference drag. In some embodiments, an inboard flap hinge line is fully contained within the wing contour with the wing upper and lower surfaces held as planar as possible to facilitate seal design.

With the resulting wing configuration, the wing gull raises the engines 616 to increase available tip back angle and reduce thrust-induced pitching moments. The gull enhances low-boom signature by vertically staggering the wing longitudinal lift distribution and lowers the aircraft body or fuselage 604 to reduce the height of the cabin door 638 above the ground, thereby reducing entry stair length. The low fuselage 604 assists in maintaining a low aircraft center of gravity, reducing tip over angle and promoting ground stability. The wing gull forms a wrapping of the wing 608 around the nacelle 622 that enhances favorable interference between the nacelles 618 and the wing 608, resulting in a wing/body/nacelle geometry conducive to successful ditching and gear-up landings.

The leading edge surfaces of the wing 608, including the leading-edge flap of the strake 602, the Krueger flap 614, and the leading edge flap 612 are controlled by one or more control elements to adjust aerodynamic flow fields, thereby improving aerodynamic performance in operation at various airspeeds. In addition, the leading edge surfaces can be controlled to adjust the leading-edge surface to maintain a low sonic boom signature. In some conditions, the control elements can deflect the strake 602 to reduce lift ahead of spillage at an off-design condition and maintain a low sonic boom signature.

Figure 7C:
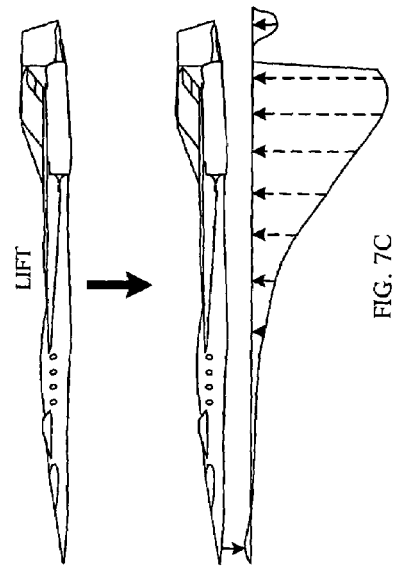
FIGS. 7A, 7B, 7C, and 7D show a series of graphs that illustrate theory upon which a low sonic boom signature is attained by controlling deployment of the thickness/camber control device.
Figure 7D:
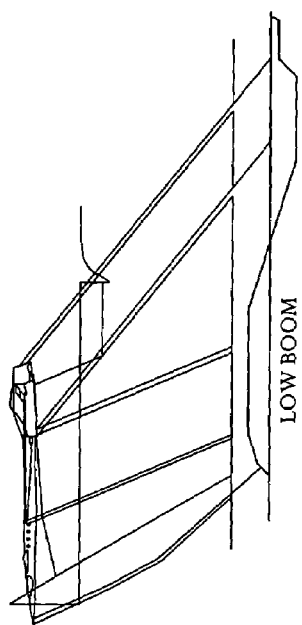
Figure 7B:
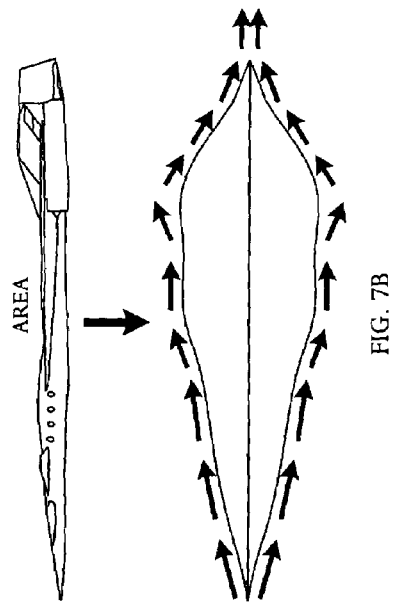
Figure 7A:
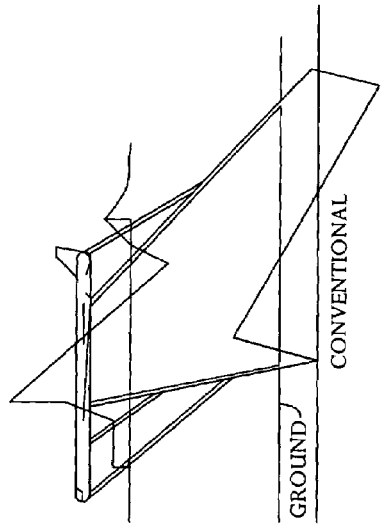

Referring to FIGS. 7A, 7B, 7C, and 7D, a series of graphs illustrate theory upon which a low sonic boom signature is attained by controlling deployment of the thickness/camber control device 601, reducing sonic boom loudness while maintaining long supersonic range. The leading edge control elements reduce sonic boom loudness by shaping the sonic boom for low shock strengths. FIG. 7A is a graph showing the pressure distribution from a conventional supersonic aircraft. The pressure distribution coalesces into an N-wave at the ground, a shape corresponding to the largest shock strength and thus the greatest loudness. One technique for reducing sonic boom amplitude at the ground involves a minimization theory in which a pressure distribution caused by a low boom aircraft follows an inversely calculated distribution to generate low shock strength at the ground. Contrary to intuition, a low boom distribution occurs when a strong leading edge compression quickly reduces in magnitude, followed by a gradually increasing weak compression that rapidly inverts into a weak expansion, followed by a stronger trailing edge expansion that gradually recompresses to ambient. Boom minimization occurs when an aircraft produces an inversely calculated pressure distribution. The pressure distribution produced by an aircraft results from a Mach angle, cross-sectional area distribution, for example as shown in FIG. 7B, and a Mach angle lift distribution, as shown in FIG. 7C. The thickness/camber control device operates to generate a local expansion on the airfoil to counteract spillage shock from the nacelles, thereby shaping the active area distribution to reduce sonic boom amplitude at the ground. A minimized pressure distribution, shown in FIG. 7D, occurs when the sum of the area pressure distribution and the lift pressure disturbance equal the minimized pressure distribution. The leading edge devices described herein can be used to shape the pressure distribution.

Figure 8:
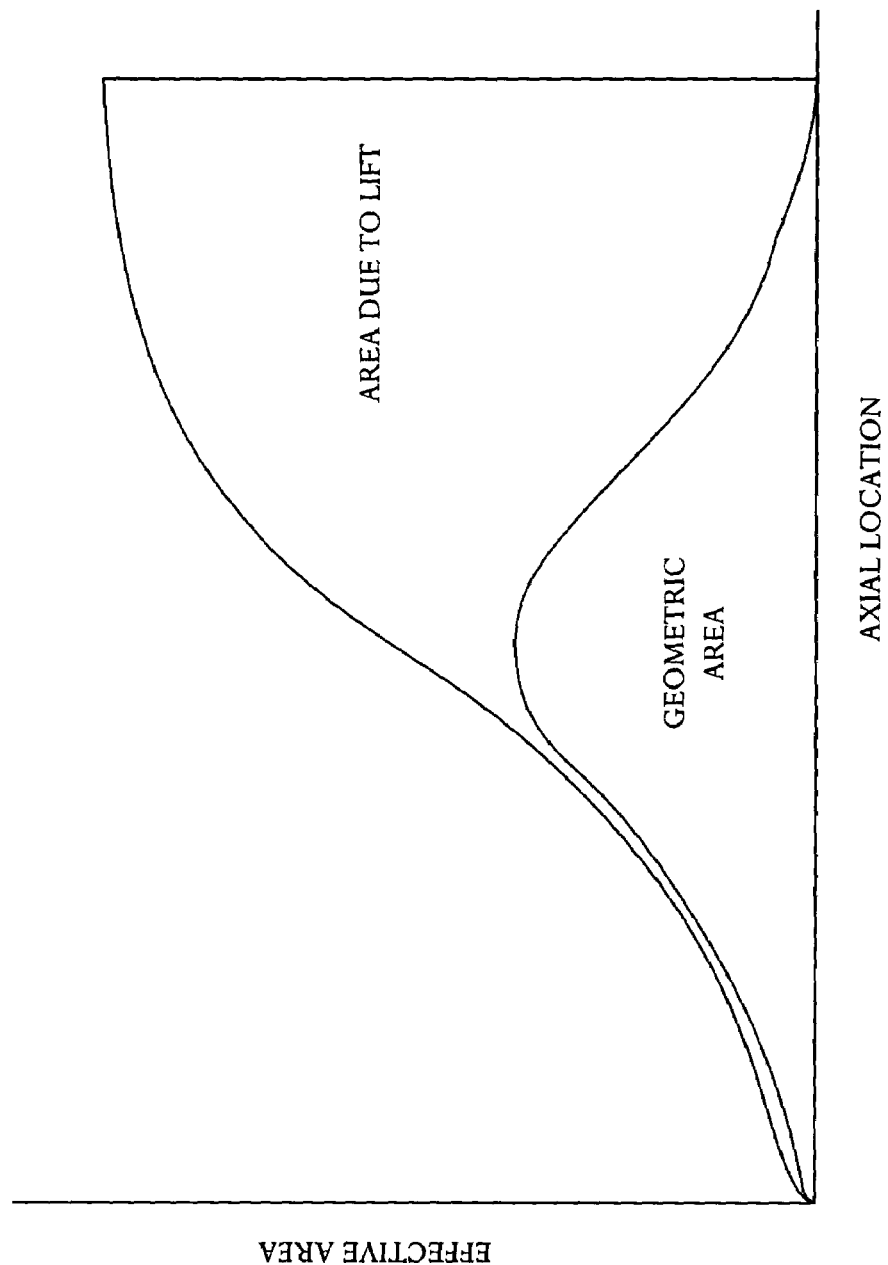
FIG. 8 is a graph that further illustrates theory of equivalent area minimization to reduce sonic boom signature, showing effective area against axial location along the longitudinal axis of the aircraft.

Referring to FIG. 8, a graph further illustrates theory of equivalent area minimization to reduce sonic boom signature, showing effective area against axial location along the longitudinal axis of the aircraft. When equivalent area due to geometric area and lift sum to the minimized distribution, a minimized ground sonic boom occurs. The thickness/camber control device is controlled to modify the airflow, counteracting the spillage shock generated by the nacelles, and possibly stretching the lifting length to move the active area distribution closer to the distribution that shapes the sonic boom signature.

Referring again to FIGS. 6A through 6C, the illustrative aircraft 600 utilizes control of the thickness/camber control device 601, in accordance with an equivalent area technique to reduce sonic boom signature. Equivalent area is the Mach angle area distribution of an axisymmetric body that generates the same disturbance as a given geometric area or given lift distribution. The equivalent area due to geometric area can be approximated as equal to the Mach angle area distribution. The equivalent area due to lift is equal to the integral of the Mach lift per unit of stream wise length times atmospheric constants.

In the illustrative embodiment, the leading edge control surfaces are controlled to reduce or minimize sonic boom by deflecting the air flow to reduce lift ahead of the spillage due to nacelles 622. For example, if the aircraft 600 is flying in an off-design condition in which the nacelles 622 are spilling air and are thus generating stronger shocks and stronger compressions, the leading edge control surfaces and be actuated to compensate by creating an expansion of air flow that blocks the spillage from coalescing into an N-wave.

The wings and engine are generally designed for selected for usage at various air speeds. Engine 616 and inlet 626 characteristics are configured to coordinate engine airflow schedules and flight Mach number. In a particular embodiment, a fixed geometry inlet 626 can be utilized, for example to reduce propulsion system weight and complexity, and thereby improve efficiency and performance. In particular fixed-geometry inlet configurations, airflow is matched at all pertinent Mach numbers so that no bypass or excessive subcritical spillage occurs under nominal conditions. Airflows at off-nominal conditions are matched using engine trim.

In one embodiment, an inlet/engine configuration is based on a supersonic aircraft engine that maintains a status range of 3600 nautical miles (nmi) at Mach 1.8. The fixed compression geometry engine inlet is optimized for Mach 1.8. A maximum Mach 1.8 capable design represents performance of the Mach 1.8-designed engine cruising at Mach 1.6. The Mach 1.8-capable engine flying at Mach 1.6 increases range and engine life, and potentially improves performance on hot-temperature days.

In an alternative embodiment, an engine 616 is configured with a fixed compression geometry inlet optimized for Mach 1.6, increasing range to approximately 4250 nmi by increasing lift/drag ratio by a full point, and a lower engine weight enabling more fuel to burn in cruise.

Various design techniques can be used to configure an aircraft for a range capability that is greater than a baseline Mach 1.8 point design approach, yet supply a greater speed capability than a Mach 1.6 point design method. One technique is to design a Mach 1.6 inlet and engine and cruise off-design at Mach 1.8 to improve range over a Mach 1.8 design inlet, for example attaining a 150–250 nmi improvement in range. A second technique involves designing the aircraft as a Mach 1.6 point design for maximum range and accepting any overspeed capability that happens to occur, resulting in a small speed increase for a fully optimized Mach 1.6 engine design that is further limited by engine life reduction as well as degradation of inlet stability and distortion. In a slight variation to the second approach, the engine can be configured as a Mach 1.6 point design with the engine and subsystem design Mach numbers tailored to any speed a Mach 1.6 inlet is capable of attaining in an overspeed condition. The range benefit is even smaller than the effect of a pure Mach 1.6 aircraft but the overspeed capability can be improved although not to the level of a Mach 1.8 design. A third approach incorporates a variable geometry inlet into an otherwise Mach 1.8 configuration so that efficient on-design inlet performance can be obtained from a range from Mach 1.6 to Mach 1.8, resulting in a small range penalty due to higher weight and higher losses inherent to the variable geometry inlet. Mach 1.6 performance of the third approach is further hindered due to increased inlet weight. Translating cowls can also be used to enhance subsonic performance.

In a fourth approach, the inlet design Mach number is set such that a Mach 1.8 cruise can be attained in an overspeed condition with engine, subsystem, and aerodynamic design configured to maximize range at Mach 1.6. The illustrative concept does not operate on-design in a purest sense, although enabling the largest range of a fixed compression geometry inlet capable of cruising at Mach 1.8. Potentially, flight at a lower than design Mach number using the fixed geometry external compression engine can increase spillage drag and integrate the inlet and propulsion system in a manner that results in a higher drag.

An illustrative aircraft 600 can have inlet 626, engine 616, and airframe generally designed for Mach 1.8 performance, and further includes optimizations to improve various performance aspects. The configuration enables cruising at a slightly lower Mach number than 1.8 to attain a higher range performance. In an illustrative embodiment, the wings are sized slightly larger than normal for a Mach 1.8 design to improve takeoff and landing performance.

The control elements operating the thickness/camber control device 601 can be controlled to further facilitate operation of the aircraft 600 at off-design Mach numbers.

Other mission-related characteristics facilitated by control of the leading edge surfaces include a capability to cruise at lower Mach numbers, and a tendency to cruise at lower altitudes and lower Mach numbers, resulting from an optimum lift coefficient occurring at lower altitude as a consequence of lower speed. Furthermore, suitable engines for the desired Mach performance typically produce lower specific fuel consumption at the lower altitudes. Also, lower cruise altitudes yield excess thrust at cruise, enabling a reduction is engine cruise thrust requirement and reduced engine weight. Additionally, lower cruise altitudes allow cruise to begin earlier and end later in a mission so that the aircraft spends proportionately more of a mission in a cruise condition. Also, lower cruise Mach numbers yield lower total air temperatures, benefit engine and subsystem life. Lower cruise Mach numbers can also reduce emissions.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the structural member or body flap can be used as a sonic boom reduction device in conjunction with or separately from other boom devices such as a leading edge flap. Sonic boom reduction can be affected undertrack and off-track.

What is claimed is:

1. A thickness/camber control device for usage in a supersonic cruise aircraft with an area distribution that closely corresponds to a low sonic boom signature and with a fuselage that extends along a longitudinal axis forward and aft and includes a concentrated source of compression, the thickness/camber control device comprising:

a structural member configured to couple to the fuselage at a position forward of the concentrated source of compression; and a control element coupled to the structural member that controls the structural member to adjust thickness/camber of the fuselage to cancel the far-field effect of the concentrated source of compression, the control element configured to adjust the structural member in off-design conditions that cause the concentrated source of compression to generate a spillage shock larger than a baseline cruise configuration so that the expansion generated around the structural member effectively reduces the equivalent area distribution ahead of the shock.

2. The control device according to claim 1 wherein:

the concentrated source of compression is a nacelle that creates a spillage shock in off-design conditions that is larger than a baseline cruise configuration for a low sonic boom signature; and the control element adjusts fuselage thickness/camber so that the far-field effects of the controlled structural member and the nacelle shock substantially cancel.

3. The control device according to claim 1 wherein:

the control element adjusts the structural member in off-design conditions that cause the concentrated source of compression to generate a spillage shook larger than a baseline cruise configuration so that the far-field effect of the adjusted structural member cancels the far-field effect resulting from the spillage shock.

4. The control device according to claim 1 wherein:

the control element is capable of adjusting the structural member to improve aerodynamic flow fields for flight at Mach numbers different from the Mach number to which the aircraft design is optimized.

5. The control device according to claim 1 wherein:

the control element is capable of adjusting the structural member to effectively modify the camber of the fuselage to minimize or reduce spillage shock resulting from the concentrated source of compression.

6. The control device according to claim 1 wherein:

the structural member is selected from among a group comprising a body flap, a canard, a fairing, a speed brake, and/or a protrusion.

7. A supersonic cruise aircraft comprising:

a body that extends along a longitudinal axis forward and aft and that has a concentrated source of compression on a lower body surface, the body having an area distribution that matches a low sonic boom signature;

a structural member configured to coupled to the body at a position forward of the concentrated source of compression; and a control element coupled to the structural member that controls the structural member to adjust thickness/camber of the body to cancel the far-field effect of the concentrated source of compression and adjusts the structural member in off-design conditions that cause the concentrated source of compression to generate a spillage shock larger than a baseline cruise configuration so that the expansion generated around the structural member effectively reduces the equivalent area distribution ahead of the shock.

8. The aircraft according to claim 7 further comprising:

a fuselage;

an aircraft wing coupled to the fuselage;

an engine nacelle coupled to the aircraft wing and generating the concentrated source of compression, wherein the structural member is coupled to the fuselage forward of the engine nacelle and is capable of deployment to adjust thickness/camber of the fuselage to cancel the far-field effect of the engine nacelle.

9. The aircraft according to claim 8 wherein:

the engine nacelle creates a spillage shock in off-design conditions that is larger than a baseline cruise configuration for a low sonic boom signature; and the control element adjusts airfoil thickness/camber so that the far-field effects of the controlled structural member and the nacelle substantially cancel.

10. The aircraft according to claim 7 wherein:

the aircraft is a supersonic cruise aircraft with an area distribution that matches a low sonic boom signature; and the control element adjusts the structural member in off-design conditions that cause the concentrated source of compression to generate a spillage shock larger than a baseline cruise configuration so that the far-field effect of the adjusted structural member cancels the far-field effect resulting from the spillage shock.

11. The aircraft according to claim 7 wherein:

the control element is capable of adjusting the structural member to improve aerodynamic flow fields for flight at Mach numbers different from the Mach number to which the aircraft design is optimized.

12. The aircraft according to claim 7 wherein:

the structural member is selected from among a group consisting of a body flap, a canard, a fairing, a speed brake, and a protrusion.

13. A supersonic cruise aircraft comprising:

a fuselage that extends along a longitudinal axis forward and aft and has a concentrated source of compression;

means coupled to the fuselage at a position forward of the concentrated source of compression for adjusting thickness/camber of the fuselage whereby a local expansion is created that counters the concentrated source of compression; and means for controlling the fuselage thickness/camber adjusting means to cause the concentrated source of compression to generate a spillage shock larger than a baseline cruise configuration so that the far-field effect of the controlled fuselage thickness/camber adjusting means cancels the far-field effect resulting from the spillage shock.

14. The aircraft according to claim 13 further comprising:

means for deploying the fuselage thickness/camber adjusting means to create a concentrated expansion at a position forward of the concentrated source of pressure.

15. The aircraft according to claim 13 further comprising: means for adjusting fuselage thickness/camber to cancel far-field effect of the concentrated source of pressure.

16. The aircraft according to claim 13 further comprising: the fuselage thickness/camber adjusting means positioned at a location an the fuselage that facilitates cancellation of the far-field effect of the concentrated source of compression.

17. The aircraft according to claim 13 further comprising:
means for controlling the aircraft to fly at off-design conditions that causes the concentrated source of compression to create a spillage shock larger than a baseline cruise configuration for a low sonic boom signature; and
means for varying fuselage thickness/camber so that the far-field effects of the fuselage thickness/camber adjusting means and the concentrated source of compression substantially cancel.

18. The aircraft according to claim 13 further comprising:
means for matching the aircraft area distribution to a low sonic boom signature; and
means for operating the fuselage thickness/camber adjusting means in off-design conditions that cause the concentrated source of compression to generate a spillage shock larger than a baseline cruise configuration so that the far-field effect of the fuselage thickness/camber adjusting means cancels the far-field effect resulting from the spillage shock.

19. The aircraft according to claim 13 further comprising:
means for operating the fuselage thickness/camber adjusting means to improve aerodynamic flow fields for flight at Mach numbers different from the Mach number to which the aircraft design is optimized.

20. The aircraft according to claim 13 further comprising:
means for operating the fuselage thickness/camber adjusting means to effectively modify the camber of the fuselage to minimize or reduce spillage shock resulting from the concentrated source of compression.

21. An aircraft comprising:
an aircraft body in a supersonic cruise configuration with an area distribution that matches a low sonic boom signature;
a structural member coupled to the aircraft body at a position forward of a concentrated source of compression on the aircraft body; and
a controller adapted to adjust the structural member in off-design conditions that cause the concentrated source of compression to generate a spillage shock larger than a baseline cruise configuration so that the far-field effect of the adjusted structural member cancels the far-field effect resulting from the spillage shock.

* * * * *